United States Patent
Colegrove

(10) Patent No.: US 9,120,525 B2
(45) Date of Patent: Sep. 1, 2015

(54) BICYCLE FRAME ASSEMBLY WITH INTEGRAL FASTENER PASSAGE

(71) Applicant: James Colegrove, Lake Mills, WI (US)

(72) Inventor: James Colegrove, Lake Mills, WI (US)

(73) Assignee: Trek Bicycle Corporation, Waterloo, WI (US)

( * ) Notice: Subject to any disclaimer, the term of this patent is extended or adjusted under 35 U.S.C. 154(b) by 0 days.

(21) Appl. No.: 13/735,022

(22) Filed: Jan. 6, 2013

(65) Prior Publication Data

US 2014/0131974 A1    May 15, 2014

Related U.S. Application Data

(63) Continuation of application No. 13/178,866, filed on Jul. 8, 2011, now abandoned.

(51) Int. Cl.
| | | |
|---|---|---|
| *B62J 11/00* | (2006.01) | |
| *B62K 19/30* | (2006.01) | |
| *B62K 19/40* | (2006.01) | |
| *B29C 45/14* | (2006.01) | |
| *B29C 45/00* | (2006.01) | |
| *B62K 3/04* | (2006.01) | |
| *B62K 19/16* | (2006.01) | |
| *B62K 21/02* | (2006.01) | |
| *B62J 99/00* | (2009.01) | |

(52) U.S. Cl.
CPC .............. *B62K 19/40* (2013.01); *B29C 45/0005* (2013.01); *B29C 45/14786* (2013.01); *B62K 3/04* (2013.01); *B62K 19/16* (2013.01); *B62K 19/30* (2013.01); *B62K 21/02* (2013.01); *B62J 11/00* (2013.01); *B62J 2099/0046* (2013.01); *Y10T 29/49947* (2015.01)

(58) Field of Classification Search
CPC .... B62K 19/40; B62K 2700/16; B62K 19/16; B62K 19/30; B62K 21/02; B62K 3/04; B62J 11/00; B62J 2099/0046; F16C 1/103; F16C 1/106; F16C 1/26; F16L 3/08
USPC ................... 280/281.1, 288.2, 288.3, 288.4; 74/502.4, 502.6, 489; 224/424, 425, 224/450, 460, 463; 403/384, 399, 396; 428/65
See application file for complete search history.

(56) References Cited

U.S. PATENT DOCUMENTS

| | | | | |
|---|---|---|---|---|
| 3,893,647 A | * | 7/1975 | Kennedy | 248/68.1 |
| 4,678,054 A | * | 7/1987 | Honda et al. | 180/225 |
| 5,236,212 A | * | 8/1993 | Duehring et al. | 280/281.1 |
| 5,568,905 A | * | 10/1996 | Smith, II | 248/65 |

(Continued)

FOREIGN PATENT DOCUMENTS

DE        102009054380        * 6/2011

*Primary Examiner* — Anne Marie Boehler

(57) ABSTRACT

A bicycle frame assembly having a number of elongate tubes that are connected to define a shape of the bicycle frame. The assembly includes a passage that is defined by the elongate member, a partition, and a bridge. The partition isolates the passage from an interior volume of the elongate tube. The bridge extends in a direction normal to an elongate direction of the passage and defines an inlet and an outlet of the passage. The inlet, outlet, and bridge are generally flush with an exterior surface of the elongate tube and provide a passage that cooperates with a flexible connector, such as a cable tie, for securing supplemental structures, such as brake and shift control cables, to the elongate tube of the bicycle frame assembly.

13 Claims, 4 Drawing Sheets

(56) References Cited

U.S. PATENT DOCUMENTS

| | | | |
|---|---|---|---|
| 5,803,654 A * | 9/1998 | Spease et al. | 403/384 |
| 6,330,989 B1 * | 12/2001 | Okamoto | 248/74.1 |
| 6,725,978 B2 * | 4/2004 | Karpowich | 188/20 |
| 6,862,949 B2 * | 3/2005 | Hanamura | 74/502.6 |
| 7,291,787 B2 * | 11/2007 | Nishimoto | 174/136 |
| 7,651,110 B2 * | 1/2010 | Davis et al. | 280/281.1 |
| 7,854,442 B2 * | 12/2010 | Onogi et al. | 280/288.3 |
| 2006/0254381 A1 * | 11/2006 | Chamberlain | 74/502.4 |

* cited by examiner

BICYCLE FRAME ASSEMBLY WITH INTEGRAL FASTENER PASSAGE

CROSS-REFERENCE TO REALTED APPLICATIONS

This application is a Continuation of U.S. application Ser. No. 13/178,866, filed Jul. 8, 2011, now abandoned which is incorporated herein by reference in its entirety.

BACKGROUND OF THE INVENTION

The present invention relates generally to bicycles and, more particularly, to bicycle frame structures having an integrally formed passage constructed to sleekly and conveniently accommodate a fastener useable for securing supplemental structures, such as brake or shift control cables, or other bicycle accessories or mounting bosses to the underlying frame of the bicycle assembly.

During cycling, the cyclist interacts with a number of control systems, such as brake and shift systems that effect operation of the bicycle. As is commonly understood, both such systems commonly include an operator, such as brake or shift lever, that is commonly situated proximate the grip areas of a handlebar. Rider interaction with the respective lever facilitates movement of structures of the bicycle, such as a brake device or chain derailleur. Commonly, an elongate member, such as a cable or fluid connector, extends between the operator and the system whose operation is controlled by the lever.

With respect to the braking systems, rider manipulation of a respective brake lever causes manipulation of the elongate member which in turn causes actuation of a brake system. Understandably, bicycles can be provided with only front brake systems, only rear brake systems, or both front and rear brake systems. Such brake systems are commonly provided as rim brake systems whereby brake pads interact with a rim of a corresponding wheel or as disk brake systems wherein brake pads interact with a brake disk that is positioned nearer the hub of a respective wheel than the rim of the corresponding wheel. Regardless of the specific configuration of the brake system or the number of braking systems a bicycle is provided with, the elongate member communicates the rider's instructions from the brake lever to a corresponding brake system to slow the bicycle.

Like brake systems, many bicycles are provided with multi-geared drive train systems. Such systems commonly include a cassette or gear set that is attached to a rear wheel of the bicycle and a crankset that is attached to the pedals of the bicycle. In many high performance bicycles, each of the crankset and the gear set include multiple gears of varied diameters. A flexible drive member, such as a chain or a belt, operationally engages each of the gear set and the crankset and communicates the rider pedal force from the crankset to the wheel gear set. A derailleur is positioned proximate each of the multi-geared crankset and gear set to effectuate shifting of the belt or chain between the various gears of the respective set. As is commonly understood, riders frequently shift the chain between the various gears to maintain a desired cadence associated with a given ride environment. Said in another way, riders can shift the belt or chain from operative interaction with the various gears of the cassette or gear set and/or the crankset to maintain a desired torque associated with desired operation of the pedals.

Like brake systems, gear train shift controls commonly include a handle or shift lever that is also positioned proximate the handlebars, the respective derailleur, and an elongate member or shift cable that extends between the respective shift lever and the corresponding derailleur. Operation of a respective shift lever laterally translates a corresponding derailleur which in turn biases the flexible drive member, be it a chain or a belt, into engagement with an adjacent gear associated with the respective gear set or crankset. The elongate operator extends between the shift lever and a respective front or rear derailleur and communicates the rider's shift instructions to the respective gear set or crankset of gears.

Commonly, a single lever assembly can be provided which has multiple operational directions so that both braking and shifting can be effectuated with a single lever assembly. Regardless of the specific construction of the given lever system and the operation of the corresponding derailleur or brake system, an elongate member, commonly in the form of a sheathed cable and less frequently in the form of a hydraulic control cable or an electrical cable, extends between the respective lever assembly and the corresponding operational system. These elongate members must be secured to the underlying bicycle in a manner such that operation of a given lever assembly yields repeatable operation of the underlying brake and/or derailleur systems. Commonly, the lever end and a system end of the elongate member must be secured to the underlying bicycle so that a cable is freely translatable without interference from either the sheath of the cable or the mounting assembly. Likewise, the elongate members must also be periodically secured to the underlying bicycle frame or adjacent structure to prevent undesired snagging and/or movement of the underlying cable.

Many bicycle frames having external cable operating systems include integral cable mounts that are formed or secured to the bicycle frame at locations near the terminal ends of the respective operational ends of the cable and intermediate locations along extended lengths of the control cable. Such systems commonly require elongate members that are specifically or uniquely configured for interaction with a given bicycle configuration. Such a requirement unnecessarily increases the expense and expertise associated with both installing and replacing the elongate member associated with such control systems. Such systems are also susceptible to the drawbacks associated with a gap or space between the elongate member and the underlying bicycle frame as the mounting arrangements commonly create such a gap at least the distal sheathed ends of the elongate member as well as at discrete locations along the longitudinal length of the elongate member. Such spacing increases the footprint of the cross section associated with the elongated frame member and its associated signal conductors and can result in unintended interaction with the elongate control signal conductor.

Others, having recognized one or more of the shortcomings associated with such external mounting of the elongate control members, have turned to mounting arrangements wherein the elongate control members pass mostly, or at least partly, through the interior passages defined by the frame assembly of the bicycle. Although such systems provide substantial protection to the integrity of the elongate control member, such systems also present a number of drawbacks related to the construction of the underlying bicycle. Although the internal passages are generally free of obstructing structures, forming the openings and corresponding grommets associated with maintaining a sealed bicycle frame tends to complicate the overall construction and/or assembly of the underlying bicycle. Particularly problematic for such configurations are the pivotable or rotatable joints of the bicycle assembly, such as the steerer assembly, as well as the more congested areas of the bicycle structure, such as the bottom bracket assembly. Furthermore, some internal routing systems require disassembly of ancillary systems, such as the steerer assembly, the fork assembly, or the crankset assembly if service of the elongate control member is required. The various supplemental parts, tortuous routing, and commonly required sequential manipulation of ancillary systems can unduly complicate the manufacture, assembly, and serviceability of such internal cable routing methodologies.

Regardless of the interior or exterior routing of the elongate control members, formation of the mount supports associated with both such systems must be considered during the design and construction of the underlying bicycle frame and/or rigid frame members such as the top tube, the head tube, the down tube, the seat tube, the chain stays, the seat stays, and the fork legs. Supplemental manufacturing processes such as the welding or bonding of mount supports to the rigid members or the formation of supplemental openings or passages alters the structural performance of the respective frame member. Commonly, reinforcement is provided at the location of such mounts and/or the walls of the respective structural member are thicker than the nominal thickness of the elongated frame members. Such considerations complicate both the design and the construction of the rigid frame members of the bicycle assembly.

The various considerations discussed above with respect to the secure and compact association of the elongate control members relative to the bicycle frame members are equally applicable to the association of supplemental bicycle systems. Such systems can include bicycle performance monitoring systems, mounting of supplemental bicycle accessories, such as water bottles or water bottle mounts and cages, as well as other ancillary bicycling accessories. However, such systems are commonly secured to the bicycle frame in manners extraneous to the frame members and/or simply secured to the frame members with various adjustable and/or preformed clamping and/or mounting arrangements. Such methodologies can detrimentally impact the aerodynamic performance of the underlying bicycle and, in extreme cases, can mar or otherwise damage the finish of the frame member associated with such mounting arrangements.

Accordingly, it would be desirable to have a system and method of providing a bicycle frame or structure frame member of the bicycle that includes an integral mount for securing such components to the bicycle and which do so in a manner that does not appreciably complicate the design and/or manufacture of the frame member. It is further desirable to provide such a mount that is minimally or elastically pleasing regardless of interaction with such systems therewith. It is also further desired to provide a mounting arrangement that can be quickly and conveniently interacted with by users and/or other service personnel. The present invention discloses an assembly and method of forming such a mount.

BRIEF DESCRIPTION OF THE INVENTION

The present invention provides a bicycle frame assembly having at least one mount support that overcomes one or more of the above mentioned drawbacks. The bicycle frame assembly has a number of elongate tubes that are connected to define a shape of the bicycle frame. The assembly includes a passage that is defined by the elongate member, a partition, and a bridge. The partition isolates the passage from an interior volume of the elongate tube of the frame member. The bridge extends in a direction normal to an elongate direction of the passage and defines an inlet and an outlet of the passage. The inlet, outlet, and bridge are generally flush with an exterior surface of the elongate tube and provide a passage that cooperates with a flexible connector, such as a cable tie, for securing supplemental structures, such as brake and shift elongate control members and/or other bicycling accessories, to the elongate tube of the bicycle frame assembly.

One aspect of the invention useable with one or more of the features of the above aspects discloses a bicycle assembly that includes a plurality of elongate members that are connected and form a top tube, a head tube, a down tube, a seat tube, at least one chain stay, at least one seat stay, and at least one fork leg. At least one of the plurality of elongate members includes a hollow tube shape that is defined by a wall having an exterior surface and an interior surface that faces an interior cavity bounded by the wall. The at least one elongate member has at least one mount that is integrally secured to the wall so that an outer surface of the mount is generally flush with the exterior surface of the wall. A passage is defined by the mount and positioned inboard of the exterior surface of the wall and isolated from the interior cavity of the at least one elongate member. A rib extends over the passage of the mount and defines an entrance and an exit of the passage.

Another aspect of the invention that is usable with one or more of the features of the aspects described above includes a bicycle frame assembly having a plurality of tubes that define a bicycle frame assembly. At least one of the plurality of tubes has a hollow portion that is defined by a wall having an exterior surface that faces atmosphere and an interior surface that faces the hollow portion of the tube. A passage having a first opening and a second opening that are both at least generally flush with the exterior surface of the tube is formed in the tube. The passage extends inboard of the exterior surface of the tube and is fluidly isolated from the hollow portion of the tube. A connector passes through the passage between the first opening and the second opening and secures a supplemental structure to the bicycle frame assembly.

Another aspect of the invention that is useable with one or more of the features of the above aspects discloses a method of forming a bicycle structure. A mold is provided that has a first mold half and a second mold half that cooperate to define a cavity that defines a majority of an exterior surface of a hollow finish part when the mold is closed. An insert is provided that cooperates with at least one of the first mold half and the second mold half and is positioned in the cavity when the mold is closed. The insert defines a passage and a bridge. The passage extends through the finish part and is defined by a partition that separates an interior volume of the hollow finish part from the passage and from atmosphere and the bridge defines an inlet and an outlet of the passage. Removal of the hollow finish part from at least one of the first mold half and the second mold half exposes the inlet and outlet to atmosphere such that the inlet and outlet are separated from one another by the bridge and are flush with the exterior surface of the hollow finish part.

It is appreciated that the aspects and features of the invention summarized above are not limited to any one particular embodiment of the invention. That is, many or all of the aspects above may be achieved with any particular embodiment of the invention. Those skilled in the art will appreciate that the invention may be embodied in a manner preferential to one aspect or group of aspects and advantages as taught herein. These and various other aspects, features, and advantages of the present invention will be made apparent from the following detailed description and the drawings.

BRIEF DESCRIPTION OF THE DRAWINGS

The drawings illustrate preferred embodiments presently contemplated for carrying out the invention.

DETAILED DESCRIPTION OF THE PREFERRED EMBODIMENT

Figure 1:
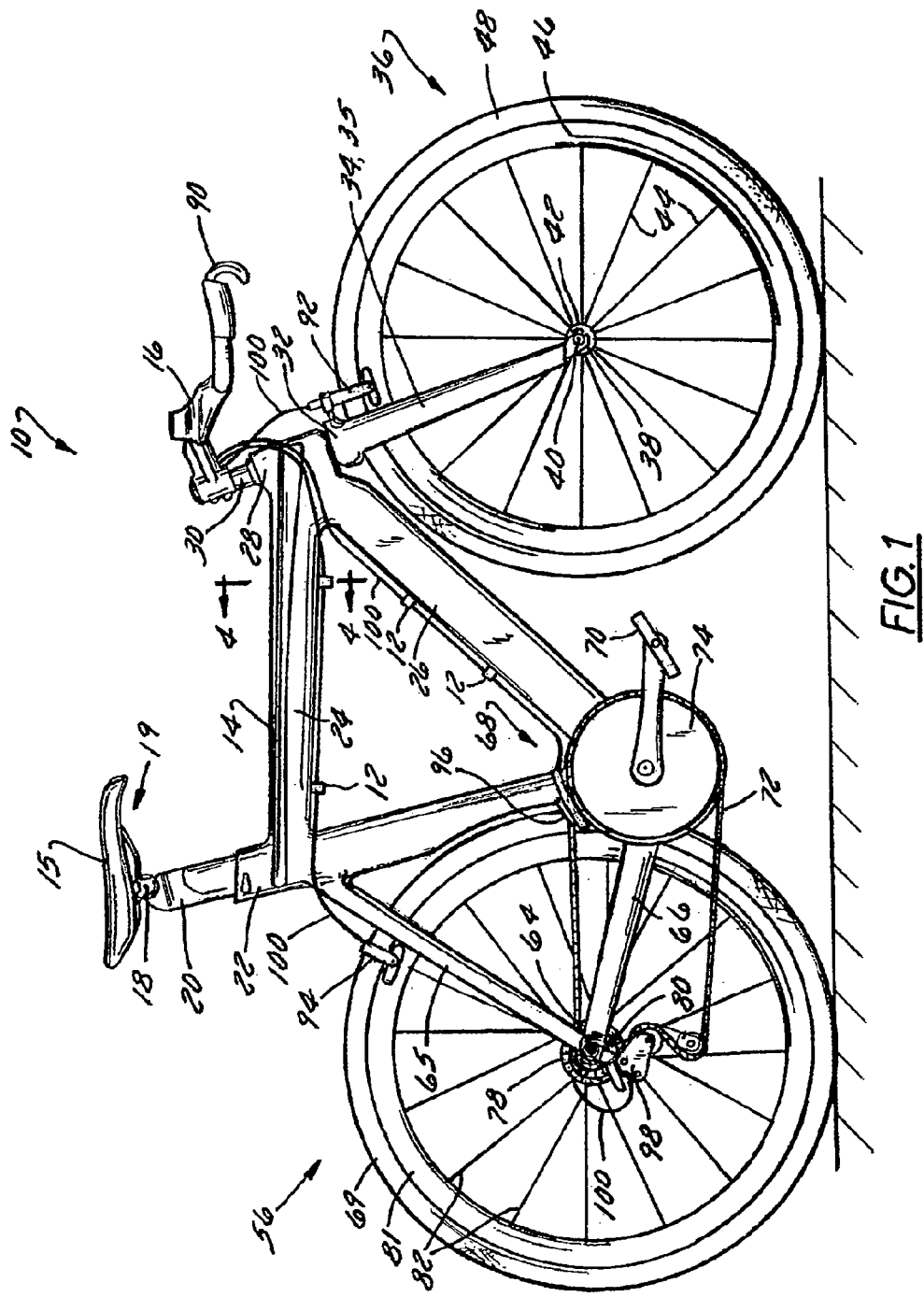
FIG. 1 is an elevational side view of a bicycle having a frame that includes a number of mount supports according to the present invention.

FIG. 1 shows a bicycle assembly or simply a bicycle 10 equipped with a number of mount supports or simply mounts 12 that is constructed in accordance with the present invention. Bicycle 10 includes a frame 14 that includes a number of structural members that are disposed between a seat 15, handlebars 16, pedals, and wheels of bicycle 10. As used herein, the structural members of bicycle 10 can include one or more of what is commonly referred to a top tube, a head tube, a down tube, a seat tube, one or more seat stays, one or more chain stays, and one or more fork legs. It is appreciated that the present invention is generally applicable to any portion of bicycle assembly 10 wherein a compact and robust mount is desired to be positioned.

Still referring to FIG. 1, a seat clamp 18 is engaged with an underside 19 of seat 15 and cooperates with a seat post 20 that slidably engages a seat tube 22 of frame 14. A top tube 24 and a down tube 26 extend forwardly from seat tube 22 to a head tube 28 of frame 14. Handlebars 16 are connected to a steerer tube 30 that passes through head tube 28 and engages a fork crown 32. A pair of forks 34, 35 extend from generally opposite ends of fork crown 32 and are constructed to support a front wheel assembly 36 at an end thereof or fork tip 38. Fork tips 38 engage generally opposite sides of an axle 40 that is constructed to engage a hub 42 of front wheel assembly 36. A number of spokes 44 extend from hub 42 to a rim 46 of front wheel assembly 36. A tire 48 is engaged with rim 46 such that rotation of tire 48, relative to forks 34, rotates rim 46 and hub 42.

A rear wheel assembly 56 is positioned generally concentrically about a rear axle 64. A seat stay 65 and a chain stay 66 offset rear axle 64 from a crankset 68. Crankset 68 includes pedals 70 that are operationally connected to a flexible drive such as a chain 72 via a one or more variable diameter chain rings or sprockets 74. Rotation of chain 72 communicates a drive force to a gear cluster 78 having at least one drive gear that is driven by rotation of chain 72. Like crankset 68, gear cluster 78 can include one or more generally concentrically orientated variable diameter gears.

Gear cluster 78 is operationally connected to a hub 80 associated with a rear tire 69 of rear wheel assembly 56. A number of spokes 82 extend radially between hub 80 and a rim 81 that supports tire 69 of rear wheel assembly 56. As is commonly understood, rider operation of pedals 70 drives chain 72 thereby driving rear tire 69 which in turn propels bicycle 10. It is appreciated that bicycle 10 could be provided in either of a road bicycle of mountain or off-road or trail bicycle configuration. It is appreciated that each configuration includes features generally directed to the intended operating environment of the bicycle. For example, trail bicycles generally include more robust suspension and tire systems than road bicycles. It is further appreciated that mount supports according to the present invention are equally applicable to stationary bicycles and/or other vehicles or devices configured to support a seated rider and constructed for generally cyclic and/or repeatable movement of a user's legs whereby user manipulation of various levers alters operation of the underlying vehicle.

Bicycle 10 includes one or more operating levers 90 that are supported by handlebars 16. Levers 90 are operationally connected to one or more of a front wheel brake system 92, a rear wheel brake system 94, a front or crankset shift mechanism or front derailleur 96, and a rear wheel or cassette derailleur 98, via one or more elongated control elements 100. As described above, operation of brake systems 92, 94 causes interaction of brake pads with the respective wheel assembly 36, 56 to slow bicycle 10. Although brake systems 92, 94 are both shown as what is commonly understood as a rim brake, it is envisioned that the present invention is equally applicable to disk brake systems which commonly have a disk and caliper positioned nearer the respective hub 42 64 of a corresponding wheel assembly 36, 56 than to the corresponding rim 46, 81.

As also alluded to above, one or more levers 90 are also operationally connected to front derailleur 96 and/or cassette derailleur 98 to effectuate a desired shifting between the respective gears of either the various gears of crankset 68 and/or rear wheel gear cluster or cassette 78. As is commonly understood, lateral translation of the respective derailleur 96, 98, as determined from a plane of rotation of the corresponding gear set, biases the flexible drive member or chain 72 in a lateral direction or in a direction for operational interaction with a respective adjacent gear. As previously explained, handlebars 16 can be provided with any number of single function or multiple function lever assemblies to effectuate the shifting and braking of the underlying bicycle 10. That is, some lever assemblies are operational in multiple directions and/or support multiple discrete operators that and be manipulated by the hands of the rider to effectuate a desired crankset or cassette shifting operation and/or a front wheel or rear wheel braking operation. Regardless of the configuration of the lever, elongate members 100 communicate the input signal to the respective braking and/or shifting system to effectuate the desired manipulation of the respective system. As explained further below, although elongate signal conductors or elongate members 100 are disclosed as being a sheathed cable, it is envisioned that mount supports 12 are useable with other elongate members and/or for securing other bicycle accessory or ancillary systems relative to the rigid frame members to the bicycle assembly.

Figure 2:
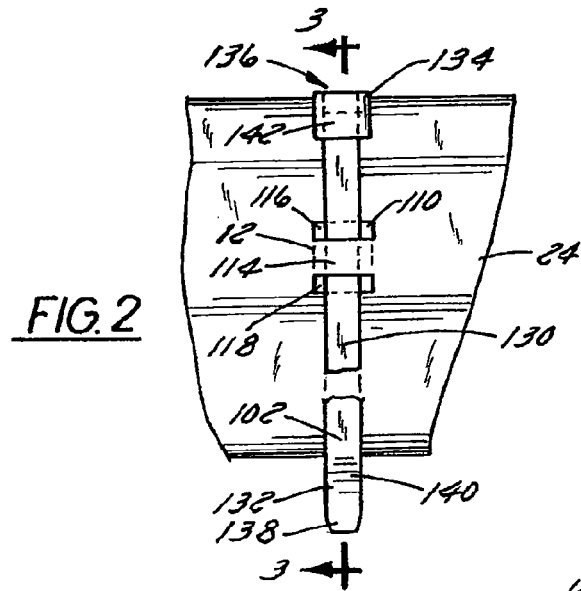
FIG. 2 is a plan view of one of the mount supports shown in FIG. 1 with an open flexible connector in the form of a cable or zip tie engaged with the mount support.

FIG. 2 is a plan view of one of mounts 12 shown in FIG. 1 with a flexible fastener or connector, such as a cable tie or zip tie 102, engaged with mount 12. Referring to FIGS. 2-5, bicycle frame member 24 includes a wall 104 that generally defines the elongate shape of frame member 24. Wall 104 separates an interior cavity 106 of frame member 24 from atmosphere 108. Each mount support 12 includes a passage 110 that is defined by a partition 112 that fluidly separates passage 110 from cavity 106 of frame member 24. A rib or bridge 114 extends over passage 110 thereby defining an inlet or entrance 116 and an outlet or exit 118 of passage 110.

Figure 3:
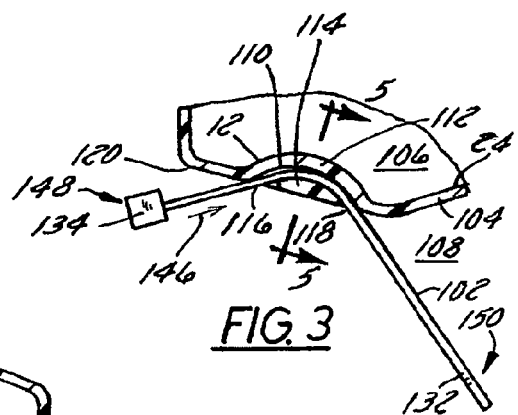
FIG. 3 is a cross section view of the mount support shown in FIG. 2 and taken along line 3-3.
Figure 4:
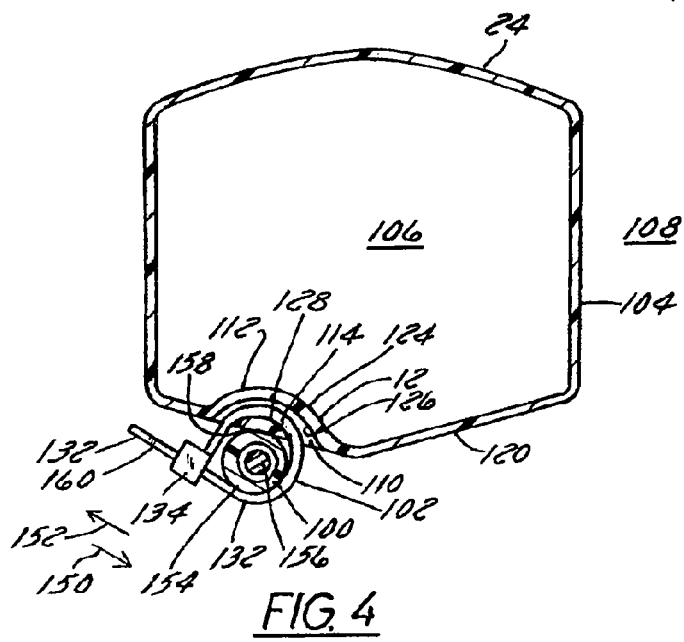
FIG. 4 is a view similar to FIG. 3 and shows the cross section of the bicycle frame member and an elongate control element secured to the frame member via cooperation of the flexible connector and the mount support.
Figure 5:
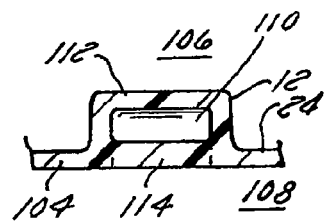
FIG. 5 is a cross section view of the mount support shown in FIG. 2 and taken along line 5-5 in FIG. 3.

As best shown in FIGS. 3 and 4, entrance 116, exit 118 and bridge 114 are at least generally, and preferably flush with an exterior surface 120 of frame member 24 as defined by the outside surface of wall 104. Partition 112, bridge 114, and wall 104 of mount support 12 and frame member 24 cooperate in such a manner that entrance and exit 116, 118 of passage 110 are fluidly exposed to atmosphere 108 while maintaining a fluid isolation of passage 110 from cavity 106 as defined by an interior surface 122 of wall 104 and an interior facing surface 124 of partition 112. An exterior facing surface 126 of partition 112 faces an interior facing surface 128 of bridge 114. Surface 126 acts as a guide when fastener 102 is passed therethrough. It is further appreciated that fastener 102 could be first introduced to either of entrance or exit 116, 118 and retrieved from the other of entrance or exit 116, 118.

Still referring to FIGS. 2-4, flexible connector 102 includes an elongate body 130 having an elongate rack portion 132 and a head portion 134. As is commonly understood, head portion 134 includes a passage or opening 136 that is constructed to slidably receive rack portion 132 of flexible connector 102. A distal end 138 of flexible connector 102 passes through opening 136 such that a number of teeth or a rack 140 integrally formed on rack portion 132 adjustably cooperate with a ratchet 142 associated with head portion 135 and positioned for interfering engagement with opening 136.

As shown in FIGS. 3 and 4, elongate portion 132 of fastener 102 slidably cooperates with passage 110 of mount support 112, indicated by arrow 146, such that opposite ends 148, 150 of the flexible connector 102 extend beyond entrance 116 and exit 118 of mount support 112. Passage of rack portion 132 through head portion 134 allows flexible connector 102 to define a closed loop wherein rack portion 132 cannot translate in a loosening direction, indicated by arrow 150, relative to head portion 134, but can translate in a tightening direction, indicated by arrow 152, to allow secure and compact connection of ancillary frame structures, such as an elongate control element like a brake or shift cable 100, relative to frame member 24.

As shown in FIG. 4, elongate control element 100 includes a sheath 154 and an operating cable 156 that extends through the sheath. Hand and/or tool tightening of flexible connector 102 provides a secure contact engagement of elongate control member 100 with respect to an exterior surface 158 of bridge 114. Trimming of a distal portion 160 of flexible connector 102 provides a secure, compact, and unobtrusive mounting arrangement of the elongate control member 100 relative to the underlying rigid structure of bicycle 10. The generally flush configuration of entrance 116, exit 114 and partition 114 of mount support 12 provides an mounting structure for systems ancillary to the frame but desirable for bicycle operation that is unobtrusive relative to the exterior surface 120 of frame member 24. Furthermore, the ready availability and toolless operability of fastener or flexible connector 102 allows expedient interaction with the mounting system by users intending to reconfigure, replace, and/or otherwise repair accessories or other ancillary systems that are secured to bicycle 10 The relatively compact orientation of the elongate control member 100 relative to exterior surface 120 of frame member 124 also mitigates unintended and/or undesired interference and/or interaction with the elongate control member 100.

Figure 6:
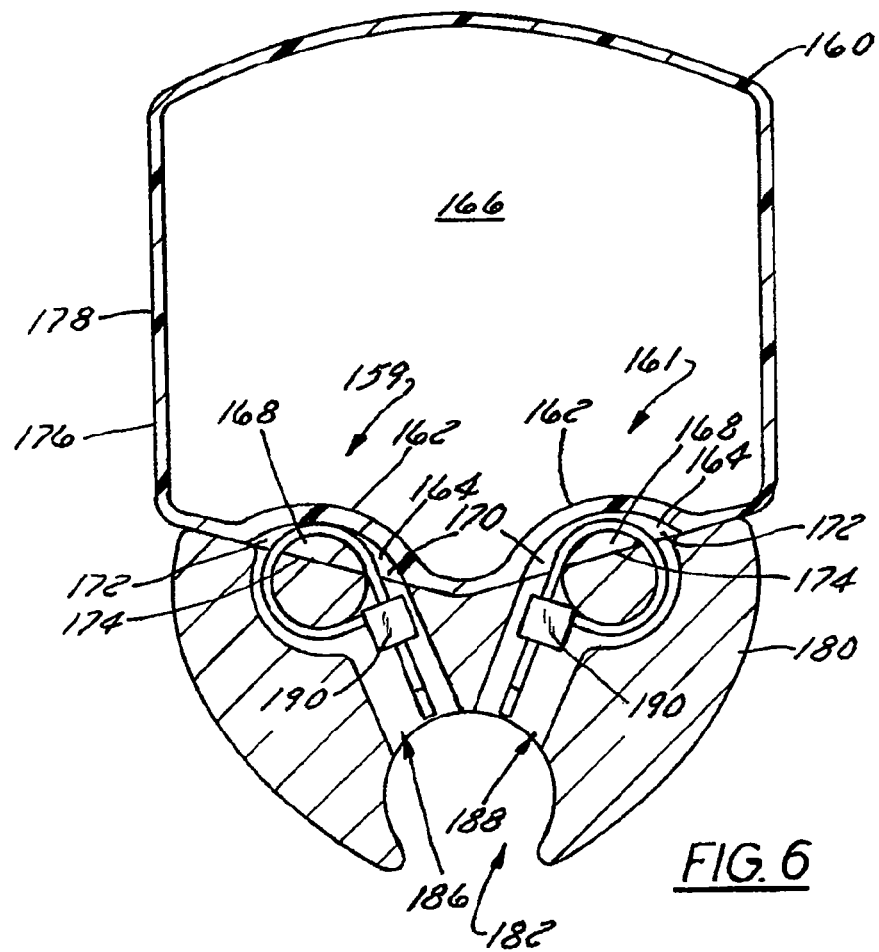
FIG. 6 is a cross section view similar to FIG. 4 of another embodiment of a structural member of the bicycle shown in FIG. 1 with an accessory mount secured to the bicycle by a pair of support mounts.

FIG. 6 shows another embodiment of the present invention. As shown in FIG. 6, a bicycle frame member 160 includes a first mount support 159 and a second mount support 161 that are located at a common cross-section of frame member 160. First and second mount supports 159, 161 are constructed in the same manner as mount support 12. A partition wall 162 isolates a passage 164 of each mount support 159, 161 from an interior cavity 166 of frame member 160. A bridge 168 extends in a transverse direction relative to a longitudinal axis of passage 164 and defines a respective entrance 170 and exit 172 of each passage 164 Entrance 170, exit 172, and an exterior surface 174 of each mount support 159, 161 are generally and preferably flush with an exterior surface 176, defined by wall 178, of frame member 160. Such a construction provides secure and non-aerodynamically detrimental mount support regardless of whether in elongate control element 100, as shown in FIG. 4, or a supplemental or ancillary bicycling accessory or accessory mount 180, is secured to the underlying frame member 160.

Still referring to FIG. 6, accessory mount 180 includes a chamber 182 configured to snap fittingly receive one or more bicycle related accessories and/or supplemental systems. It is appreciated that accessory mount 180 could have virtually any shape and/or can be configured to cooperate with any number of bicycle related accessories such as air pumps, water bottles, water bottle cages, accessory packs, or like. Accessory mount 180 includes a first passage or opening 186 and a second passage or opening 188 that are generally aligned with the overlapping or interacting ends of a flexible connector 190, such as a zip tie or cable tie, as described above. Regardless of the ancillary structure engaged with the support mount 12, 159, 160, simple manipulation of the flexible connector 102, 190, provides secure and compact positioning of ancillary bicycle frame structures relative to the underlying bicycle frame members.

Is appreciated that support mounts 12, 159, 161 could be formed in any of seat tube 22, top tube 24, down tube 26, head tube 28, one or more seat stays 65, one or more chain stay 66, handlebars 16, and/or one or more of fork legs 34, 35 of bicycle assembly 10. As explained further below, it is also appreciated that support mounts 12, 159, 161 could be formed in bicycles constructed of a number of materials such as metal frame members, aluminum frame members, carbon fiber frame members and/or combinations thereof. It is further appreciated that support mounts 12, 159, 161 could be formed in virtually any of the circumferential area associated with walls 104, 128 of the respective frame member. It is further appreciated that support mounts 12, 159, 161 could be disposed at virtually any position along the longitudinal length of the respective frame member and/or that one or more support mounts 12, 159, 161 can be formed at respective cross-sectional positions of a respective frame member. That is, it is envisioned that bicycle 10 be provided with support mounts 12, 159, 161 that are positioned anywhere along the structural members of bicycle 10 and in varied quantities and discrete longitudinal and circumferential locations to facilitate securing ancillary structures, accessories, or accessory mount structures to the underlying bicycle so as to reduce the developmental, manufacturing, and service considerations associated with maintaining the operability of the underlying bicycle.

Figure 7:
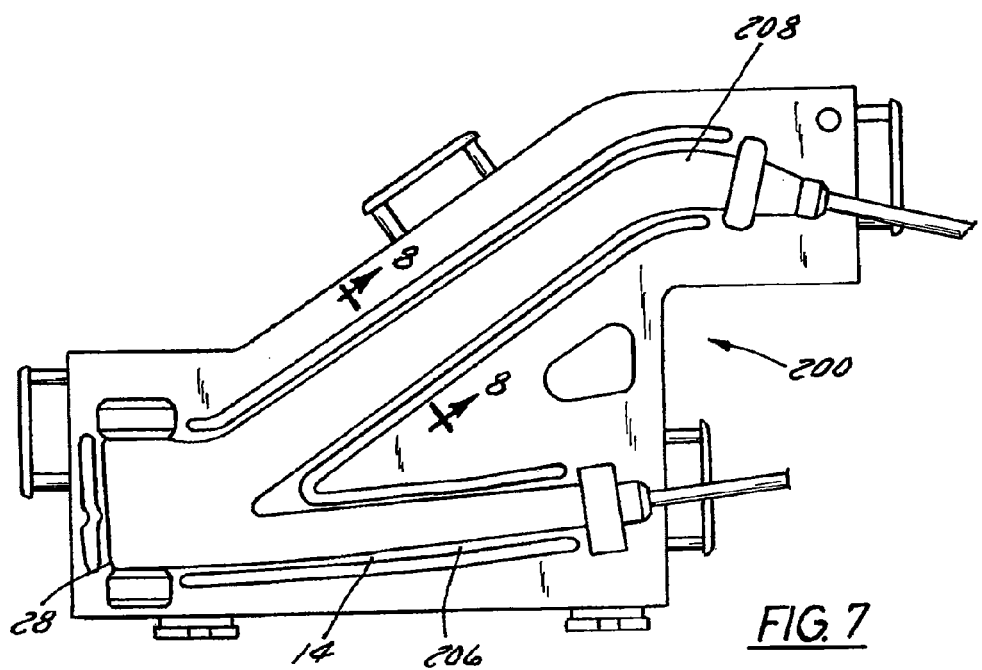
FIG. 7 is a schematic plan view of a molding system usable to form the bicycle frame shown in FIG. 1.
Figure 8:
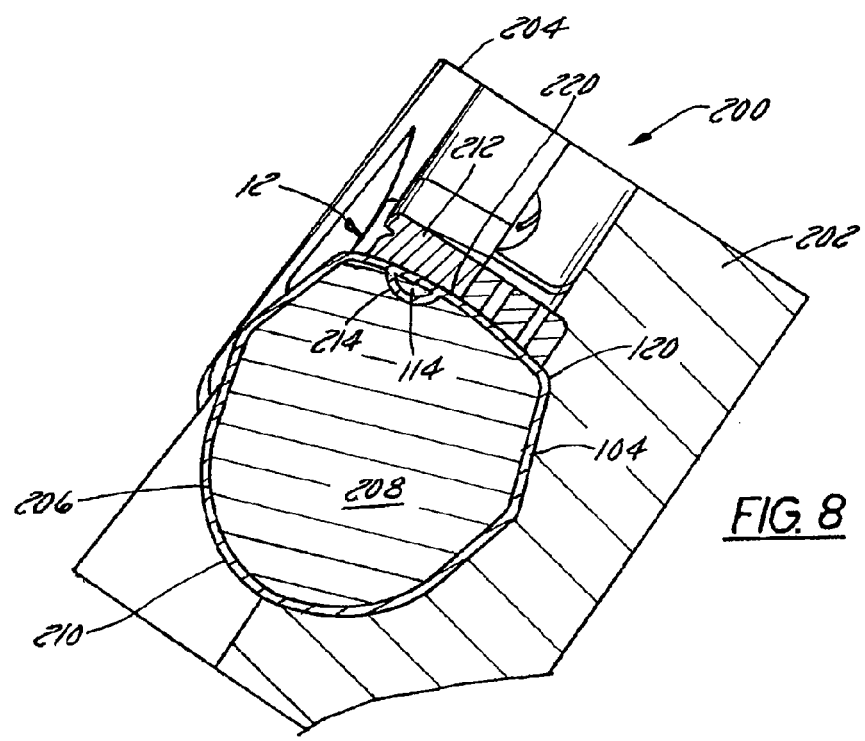
FIG. 8 is a cross section view of the mold system shown in FIG. 6 and taken along line 8-8.

FIGS. 7 and 8 show an exemplary molding system envisioned for forming one or more of the generally rigid frame members of bicycle 10. The mold 200 includes a first mold half 202 and a second mold half 204 that cooperate with one another to define a majority of the cavity 206 associated with a finish shape part 210. Referring to FIG. 7, it should be appreciated that mold cavity 206 defines a combined top tube 14, head tube 28, and down tube 26 of the bicycle frame assembly. Understandably, mold 200 could be provided in any number of shapes to form the discrete or combined rigid structures of bicycle 10.

Mold 200 includes a bladder or otherwise collapsible or removable core 208 that is shaped to define the interior cavity 106 of the bicycle frame member. As shown in FIG. 8, an insert 212 having a generally curvilinear arm 214 that defines passage 110 associated with a mount support 12, 159, 161 is disposed in mold 200. Insert 212 and arm 214 also cooperate to define bridge 114 and a portion 220 of insert 212 forms a portion of an exterior surface 120 associated with wall 104 in the finished part. Such a configuration ensures a generally smooth transition between the wall of the frame member and the area associate with mount support 12, 159, 160. Alternatively, it is envisioned that arm 214 cooperate with mold 200 in a retractable manner relative to at least one of first mold half 202 and/or second mold half 204 such that the arm 214 may be retracted from the passage formed in the finished part prior removal of the finish part from mold 200.

Preferably, frame 14 and mount support 12 are concurrently formed of a carbon fiber material. Is readily appreciated that there are a number of methods of producing such a frame assembly such as including various carbon fiber layups introduced of the mold prior to closure of the mold and/or injection of carbon fiber materials prior to and/or after closure of the mold. It is further envisioned that mount supports 12, 159, 161 be formed in bicycle frame assemblies constructed of other materials such as steel, aluminum, or metal based frame assemblies. Regardless of the underlying material construction of frame 14, mount supports 12, 159, 161 provide an integral and non-obtrusive mount support location that is generally flush with an exterior surface of the finished part and does not require supplemental cooling, machining, and/or conditioning of the mount support 12 for use with the underlying bicycle and/or ancillary or accessory systems.

Therefore, one embodiment of the invention includes a bicycle assembly having a plurality of elongate members that are connected and form a top tube, a head tube, a down tube, a seat tube, at least one chain stay, at least one seat stay, and at least one fork leg. At least one of the plurality of elongate members includes a hollow tube that is defined by a wall having an exterior surface and an interior surface that faces an interior cavity bounded by the wall. The at least one elongate member has at least one mount that is integrally secured to the wall so that an outer surface of the mount is generally flush with the exterior surface of the wall. A passage is defined by the mount, positioned inboard of the exterior surface of the wall, and isolated from the interior cavity of the at least one elongate member. A rib extends over the passage of the mount and defines an entrance and an exit of the passage.

Another embodiment of the invention that is combinable with the other embodiments includes a bicycle frame assembly having a plurality of tubes that define a bicycle frame assembly. At least one of the plurality of tubes has a hollow portion that is defined by a wall having an exterior surface that faces atmosphere and an interior surface that faces the hollow portion of the tube. A passage having a first opening and a second opening that are both at least generally flush with the exterior surface of the tube is formed in the tube. The passage extends inboard of the exterior surface of the tube and is fluidly isolated from the hollow portion of the tube. A connector passes through the passage between the first opening and the second opening and secures a supplemental structure to the bicycle frame assembly.

Another embodiment of the invention that is combinable with one or more of the above embodiments includes a method of forming a bicycle structure. A mold is provided that has a first mold half and a second mold half that cooperate to define a cavity that defines a majority of an exterior surface of a hollow finish part when the mold is closed. An insert is provided that cooperates with at least one of the first mold half and the second mold half and is positioned in the cavity when the mold is closed. The insert defines a passage and a bridge. The passage extends through the finish part and is defined by a partition that separates an interior volume of the hollow finish part from the passage and from atmosphere and the bridge defines an inlet and an outlet of the passage. Removal of the hollow finish part from at least one of the first mold half and the second mold half exposes the inlet and outlet to atmosphere such that the inlet and outlet are separated from one another by the bridge and are flush with the exterior surface of the hollow finish part.

The present invention has been described in terms of the preferred embodiments, and it is recognized that equivalents, alternatives, and modifications, aside from those expressly stated, are possible and within the scope of the appending claims. It is further appreciated that the respective features of any one of the embodiments discussed above is not necessarily solely exclusive thereto.

What I claim is:

1. An apparatus for securing objects to a bicycle, comprising:
    a wall of a bicycle frame member including a first mount and a second mount;
    wherein:
        the first mount comprises a first passage wall connected to the wall defining a first passage, a first opening and a second opening, wherein a first end of the first passage is the first opening and a second end of the first passage is the second opening;
        the second mount comprises a second passage wall connected to the wall defining a second passage, a third opening and a fourth opening, wherein a first end of the second passage is the third opening and a second end of the second passage is the fourth opening; and
        the first mount and the second mount are configured to secure an object against an exterior of the wall of a bicycle frame member when a first flexible connector is secured through the first passage and around a first portion of the object, and a second flexible connector is secured through the second passage and around a second portion of the object;
    wherein:
        the first opening, the second opening, the third opening, and the fourth opening are flush with the wall of the bicycle frame member,
        the object is secured completely outside of the mount and directly against the bicycle frame member near the mounts; and
        the first passage and the second passage are located at a common cross-section of the bicycle frame member.

2. The apparatus of claim 1, wherein a cross section of the first passage is substantially equal to a cross section of the first opening, and the common cross-section is orthogonal to a longitudinal axis of the bicycle frame member.

3. The apparatus of claim 1, wherein the first opening and the second opening are located on the same side of the bicycle frame member.

4. The apparatus of claim 1, wherein:
    an inside of the first passage is continuous with the external surface of the wall; and
    an outside of the first passage is continuous with an internal surface of the wall.

5. The apparatus of claim 1, wherein the first flexible connector comprises a cable tie and the second flexible connector comprises a cable tie.

6. The apparatus of claim 1, wherein the wall, the first mount and the second mount are integrally formed of a fiber-reinforced plastic.

7. The apparatus of claim 1, wherein the object is at least one of a cable or fluid connector.

8. The apparatus of claim 1, wherein the first flexible connector secured through the first passage and around the first portion of the object forms a closed loop.

9. An apparatus for securing objects to a bicycle, comprising:

a first wall of a bicycle frame member including a first mount, wherein the first mount comprises a first passage wall connected to the first wall defining a first passage, a first opening and a second opening, wherein a first end of the first passage is the first opening and a second end of the first passage is the second opening;

a second wall of an object including a second mount, wherein the second mount comprises a second passage wall connected to the second wall defining a second passage, a third opening and a fourth opening, wherein a first end of the second passage is the third opening and a second end of the second passage is the fourth opening; and a flexible connector;

wherein:

the flexible connector forms a closed loop through the first passage;

an exterior of the object is secured directly against an exterior of the bicycle frame member near the mounts;

the first opening, the second opening, the third opening, and the fourth opening are flush with the bicycle frame member the object is secured completely outside of the first mount, and the first passage and the second passage are located at a common cross-section of the bicycle frame member.

10. The assembly of claim 9, wherein the first passage comprises at least a 90 degree bend.

11. The assembly of claim 9, wherein the common cross-section is orthogonal to a longitudinal axis of the bicycle frame member.

12. The assembly of claim 9, wherein a longitudinal axis of the first passage is normal to a longitudinal axis of the bicycle frame member.

13. The assembly of claim 9, wherein the first passage is formed during a molding of the bicycle frame member.

* * * * *